Aug. 18, 1959

A. G. SANDISON 2,900,077

DEVICE FOR SCREENING PULP

Filed March 26, 1957

INVENTOR
A. G. SANDISON
BY: Maybee & Legris
ATTORNEYS

Aug. 18, 1959　　　A. G. SANDISON　　　2,900,077
DEVICE FOR SCREENING PULP
Filed March 26, 1957　　　　　　　　　　2 Sheets-Sheet 2

INVENTOR
A. G. SANDISON
BY: Maybee & Legris
ATTORNEYS

United States Patent Office 2,900,077
Patented Aug. 18, 1959

2,900,077

DEVICE FOR SCREENING PULP

Alexander Greswolde Sandison, Owen Sound, Ontario, Canada, assignor to The William Kennedy & Sons Limited, Owen Sound, Ontario, Canada, a corporation Application March 26, 1957, Serial No. 648,665

4 Claims. (Cl. 209—300)

This invention relates to pulp screens of the type usually referred to as centrifugal screens and, in particular, has to do with an impeller for such a screening device and to means for removing from the screen element the tailings or stock which has not passed through the screen during the screening operation.

In screening devices of this type the unscreened stock is impelled with considerable tangential velocity around the inside of a cylindrical screen element, the velocity being sufficiently high to maintain the stock against the screen element by the action of centrifugal force. It is common practice to impart the necessary tangential velocity to the stock by means of an impeller rotating within the space defined by the screen element, the impeller usually being constructed with substantially radially extending vanes.

The rate at which screening takes place and also the fineness of the screened stock depends on various factors such as the speed of the impeller, the size of the screen perforations, the relationship between tangential velocity of the unscreened stock and the pressure which this stock exerts against the screen element and the concentration of fibre in the stock carrier which is usually water.

In general, other conditions being equal, the best quality of screening is obtained with high tangential velocity and low pressure. The rate at which the stock passes through the screen element can be increased up to a point by increasing the pressure of the stock against the screen element, but such gain in capacity is usually accompanied by some deterioration in the quality of screening. The efficiency of the screening also depends to a considerable extent on the manner in which the unscreened stock is fed to the screen element, as any violent impingement of the stock against the screen produces a tendency for coarse material to be driven through or into the screen perforations resulting in both a deterioration of the quality of the screened stock and a tendency for the perforations to become plugged.

It is an object of the present invention to provide an improved construction in which the quality of screening is maintained at a high standard.

A preferred embodiment of the invention is described and disclosed herein in detail with reference to the accompanying drawings in which like reference numerals refer to like parts in the various views and in which.

Figure 1:
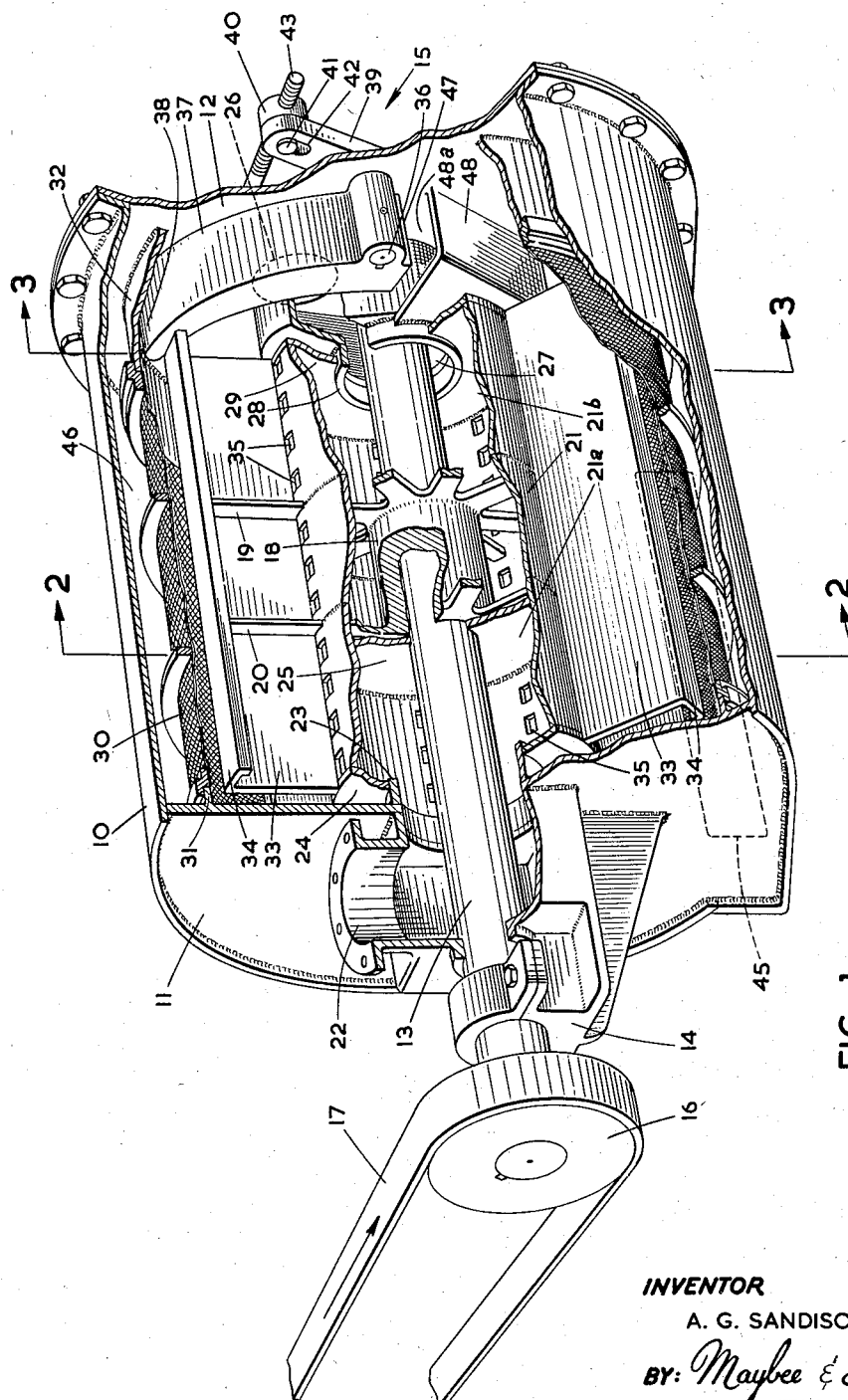
Figure 1 is a cut-away perspective view of a screening device embodying the present invention.
Figure 2:
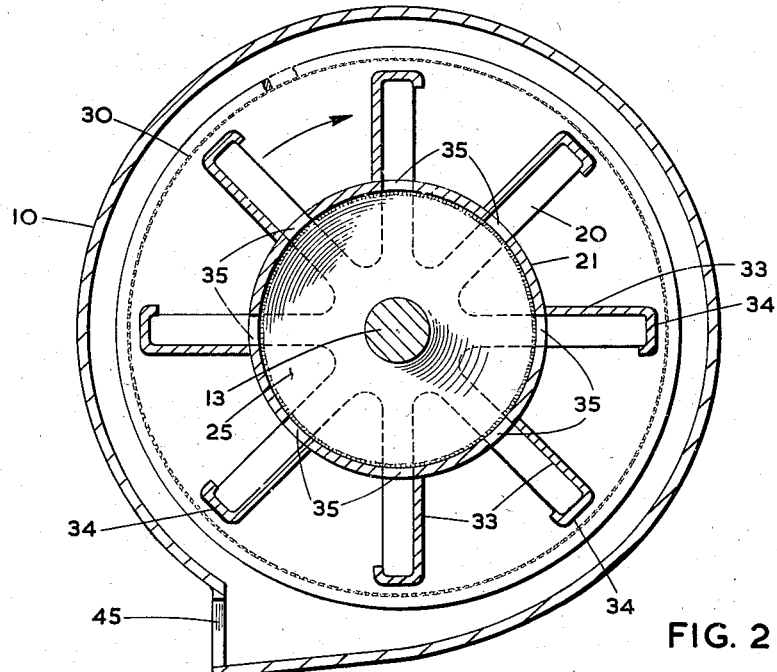
Figure 2 is a section taken along line 2—2 of Figure 1.

Referring now to Figure 1 the device will be seen to comprise a substantially cylindrical casing 10 which is provided with end walls 11 and 12 which may be secured to the casing 10 by any suitable means. A shaft 13 is rotatably mounted in journals 14 and 15 in end walls 11 and 12 respectively, a pulley 16 being provided on one end of shaft 13 to enable the shaft to be rotated by means of a belt 17 connected to a prime mover (not shown).

Mounted on the shaft 13 is a sleeve 18 which carries a pair of spiders 19 and 20 which, in turn, support a cylindrical drum 21 in spaced relationship to, but coaxial with the shaft 13. The end wall 11 is provided with an entry port 22 for unscreened stock which is constructed so as to surround the shaft 13 in such a manner that unscreened stock entering the port 22 is directed into an inlet chamber in the interior of the drum 21 surrounding the shaft 13. It will be seen that the end plate 11 of the casing 10 is provided with an axially directed flange 23 which co-operates with a radially inwardly directed flange 24 on the drum 21 to provide a substantially fluid tight seal therebetween. A partition 25 divides the interior of the drum 21 into two chambers, an inlet chamber 21a and a diluting water chamber 21b.

A port 26 is provided in the end wall 12 and is arranged in a manner similar to that described with reference to port 22. In other words material entering the port 26 is admitted to chamber 21b of the drum 21 through a opening 27 which is defined by an axially extending flange 28 which co-operates with a radially inwardly extending flange 29 on the drum 21 to form a substantially fluid tight seal. The port 26 is for the purpose of admitting diluting water to the diluting water chamber 21b in the interior of the drum 21 in a manner and for a purpose which will be described below.

Mounted within the casing 10 and coaxial with the shaft 13 is a screen element 30 of a type which is commonly used in devices of this nature. The screen element 30 is mounted by means of flanges 31 and 32, flange 31 lying on end wall 11 and extending axially of the casing 10 for a relatively short distance. Flange 32 extends axially of the casing 10 from end wall 12 a distance materially greater than flange 31 and is a continuation or extension of the screen element 30.

Extending radially outwardly from the surface of the drum 21 along lines extending axially of the drum are a series of impeller vanes 33. The vanes 33 extend radially to a point adjacent the interior surface of the screen element 30 which has an internal surface which is a surface of revolution, the surface, in the embodiment shown, being cylindrical. The vanes 33 are provided with means in the outward path of flow on their leading faces to reduce the radial velocity of the stock acted upon by them in the form of continuous lips 34 which extend in the direction of rotation of the impeller at substantially 90° to the plane of each vane. The free edges of the lips 34 are bent inwardly towards the axis of rotation of the shaft 13 to form hook shaped projections on the leading edge of each of the vanes 33.

Passages, in the form of a row of perforations 35 are provided in the drum 21 along the leading side of the base of each vane 33 to enable material within the inlet chamber and the diluting water chamber within the drum to pass radially outwardly where it may be acted upon by the leading sides of the vanes when they are rotated by the belt 17 and the pulley 16 secured to shaft 13.

Pivotally mounted on end wall 12 by means of a pivot pin 36 is an arcuate, adjustable scoop 37, the tip 38 of which extends towards the internal surface of flange 32. The pin 36 passes completely through the end wall 12 and at its outer end is keyed to a short lever 39 which is pivotally connected to a block 40 by means of pin 41 riding in slot 42 on the lever 39. A threaded shaft 43 passes through the block 40 and is rotatable by means of a hand wheel 44 to cause angular displacement of the lever 39 which will cause the tip 38 of the arcuate scoop 37 to move in a substantially radial direction towards or away from the internal surface of the flange 32. It will be appreciated, of course, that the use of the flange 32 is a matter of convenience only and that equal results would be obtained if the screen element 30 extended completely to the end wall 12 thereby eliminating the flange 32.

Figure 3:
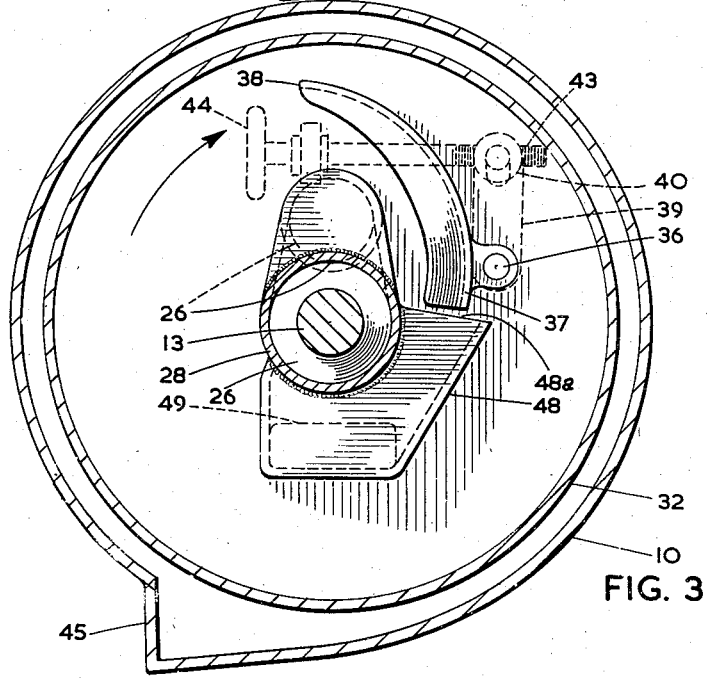
Figure 3 is a sectional view of the device taken along section 3—3 of Figure 1.

The outer casing 10 of the screening device is provided with an outlet 45 which communicates with the space 46 between the external surface of the screen element 30 and the internal surface of the casing 10. In addition, the pivoted end 47 of the adjustable scoop 37 communicates with a pocket 48 secured to or integral with the end wall 12, which pocket communicates with a port 49 (see Figure 3) which leads to the exterior of the screening device.

Having thus generally described the construction of the device illustrated in the drawings, the operation of the preferred embodiment will be described.

Assuming that a prime mover (not shown) is in engagement with the belt 17 and is in operation, the shaft 13, spiders 19 and 20 and the impeller vanes 33 will be in rotation in the direction indicated by the arrow superimposed upon the belt 17. Unscreened stock is admitted to the entry port 22 and passes into the inlet chamber 21a of the drum 21. At the same time, diluting water is admitted through port 26 and enters the diluting water chamber 21b of the drum 21 through opening 27.

The rotation of the impeller will impart a radial and tangential velocity to the stock and the diluting water and the resulting centrifugal force will cause the stock and diluting water to pass radially outwardly through the passages 35 in the drum where it will immediately be acted upon by the vanes 33 to increase the radial and tangential velocity.

As was suggested in the introductory portions of the specification, the quality of the screening will be increased if the tangential velocity imparted to the stock is high and the pressure which it imposes upon the screen element is relatively low. In addition, the radial velocity of the stock should be kept to a minimum to prevent large particles of stock from impinging upon the screen with too great a velocity, thereby plugging the screen. When the stock, which consists of a dilute liquid suspension of fibre, proceeds outward from the passages 35 it is subject to Coriolis forces tending to confine the flow to a stream pressing against leading faces of the vanes 33, while at the same time substantial radial and tangential accelerations are imparted to the stream as it flows outward. For the reasons outlined, high radial velocity is undesirable where the stream impinges on the screen element, and to minimize this each vane is provided on its leading face with eddy-inducing means to dissipate the energy of radial velocity in eddy formation. In the construction shown, the eddy-inducing means comprises a baffle consisting of a lip or baffle 34 formed at the outer end of each vane 33 on its leading side. The lip 34 extends in the direction of rotation of the vane 33 and lies substantially parallel to a tangent to the screen element 30. At the end of the lip 34 remote from its point of attachment to the vane 33 the lip 34 is again bent through 90° and extends in a radial direction towards the axis of rotation of the vane 33 for a distance which is substantially less than the width of the lip 34.

When the stream of stock flowing outward across the face of the vane strikes this lip considerable turbulent eddy formation takes place, resulting in the substantial dissipation of the energy of radial velocity so that the stream strikes the screen element 30 as a diffused stream at relatively low radial velocity, in contrast to the concentrated jet of relatively high radial velocity which would strike the screen in the absence of the lip 34. Due to the high tangential velocity the stock within the screen element is maintained by centrifugal force in the form of a hollow shell with a free inner surface. Stock fibres of a size sufficiently small will pass through the screen element 30 together with a large proportion of the water admitted through port 26 and with the stock itself into the space 46 between the screen element and the casing 10. This screened stock and water will pass out of the screening device through opening 45 where is will be carried away to a waiting receptacle. That portion of the stock, however, which does not pass through the screen element will work its way along the screen element 30 from end wall 11 towards end wall 12. At this point, the scoop 37 will engage the free inner surface of the rotating shell of stock and will pick up the excess stock or tailings and will direct them into the pocket 48 from which they will be removed through port 49. The thickness of the shell of stock can be controlled by varying the position of the tip 38 of the scoop 37. If this shell of stock is thick, then the centrifugal pressure of the stock on the screen element 30 will be relatively high. If the scoop 37, however, is adjusted to leave only a thin layer of tailings on the flange 32, then the pressure of the stock on the screen element 30 will be reduced.

It will be appreciated that although the entrance 48a to the pocket 48 is in direct communication with the interior of the screen element 30, the tangential velocity imparted to the material within the screen element 30 will be such as to prevent any material from entering the opening 48a unless directed thereinto by means of the scoop 37.

A construction of a pulp screening device has been described with which the quality of screening can be materially increased. During the passage of stock across the face of the rotating impeller vane it is subject to Coriolis acceleration which will maintain the stock in contact with the front side of the vane while at the same time increasing the radial and the tangential velocity. The stock is, however, prevented from striking the screen element 30 at full velocity as the hooked continuous lip 34 acts as an obstruction in the path of the flow and reduces the radial velocity and diffuses the stream so that the stock is finally applied to the screen element 30 without undue shock.

While a preferred embodiment of the invention has been described in detail with reference to the accompanying drawings, this is intended to be illustrative rather than limiting and minor modifications may be made in the construction and arrangement of parts without departing from the spirit of the invention or the scope of the appended claims.

What I claim as my invention is:

1. A device for screening pulp comprising an outer casing having end walls, a hollow screen element having an internal surface which is a surface of revolution mounted within and in spaced relationship to the casing, a stock inlet in one end wall of the casing to admit unscreened stock to the interior of the screen element, an outlet in the casing for screened stock which has passed through the screen element, means adjacent the end of the screen element remote from the stock inlet to remove tailings which have not passed through the screen element, a rotatable impeller within the screen element mounted on a shaft journalled in the end walls of the casing and coaxial with the screen element, the impeller having vanes lying substantially axially of the shaft and extending substantially radially therefrom, each vane having eddy-producing means lying in the path of outward flow along its leading side to dissipate the energy of radial velocity of the stock acted on by the vanes when the impeller is rotating the eddy-producing means comprising a continuous lip constraining the flow of unscreened stock to movement in a direction tangential to the surface of the screen and normal to the axis of revolution of the vanes.

2. A device for screening pulp comprising an outer casing having end walls, a hollow screen element having an internal surface which is a surface of revolution mounted within and in spaced relationship to the casing, a rotatable impeller within the screen element mounted on a shaft journalled in the end walls of the casing and coaxial with the screen element, the impeller comprising a hollow drum mounted coaxially with the shaft, a plurality of circumferentially spaced vanes on the outer surface of the drum, the vanes lying parallel to the axis of the drum and extending substantially radially outwardly therefrom, the drum being divided into two sections, an inlet in one end wall of the casing to admit unscreened stock to one section of the drum and an inlet in the other end wall to admit diluting water to the other section of the drum, means to apply unscreened stock to the leading face of each vane, an outlet in the casing for screened stock which has passed through the screen element, each vane having adjacent its radially outer edge means projecting in the direction of rotation of the impeller to reduce the radial velocity of the stock acted on by the vanes and an adjustable scoop at the end of the screen remote from the stock inlet to remove tailings which have not passed through the screen element.

3. A rotatable impeller for a device for screening pulp comprising a shaft, an inlet chamber concentrically mounted on the shaft and having circumferentially spaced radially extending vanes lying along its outer surface, the inlet chamber being provided with passages communicating between the interior of the inlet chamber and the spaces between the vanes, each vane having eddy-producing means lying in the path of outward flow along its leading face to dissipate the energy of radial velocity of material acted on by the impeller when it is rotating the eddy-producing means constraining the flow of material to movement in a direction parallel to a tangent to the shaft and normal to the axis of revolution of the shaft.

4. A rotatable impeller for a device for screening pulp comprising a shaft journalled for rotation, a hollow drum concentrically mounted on the shaft and having circumferentially spaced radially extending vanes lying along its outer surface, the interior of the drum being divided into two sections, a row of perforations in the drum along the leading side of the base of each vane, each vane having eddy-producing means along its radially outer edge extending in the direction of rotation of the impeller to dissipate the energy of radial velocity of material acted upon by the impeller when it is rotating.

References Cited in the file of this patent

UNITED STATES PATENTS

| | | |
|---|---|---|
| 122,605 | Harrison | Jan. 9, 1872 |
| 308,844 | Kuhnmunch | Dec. 2, 1884 |
| 967,345 | Dinkel | Aug. 16, 1910 |
| 1,147,239 | Haug | July 20, 1915 |
| 2,056,310 | Palmer | Oct. 6, 1936 |
| 2,246,669 | Cowan | June 24, 1941 |

FOREIGN PATENTS

| | | |
|---|---|---|
| 18,488 | Great Britain | Sept. 16, 1901 |
| 373,199 | Great Britain | Mar. 19, 1932 |